Figure 1:
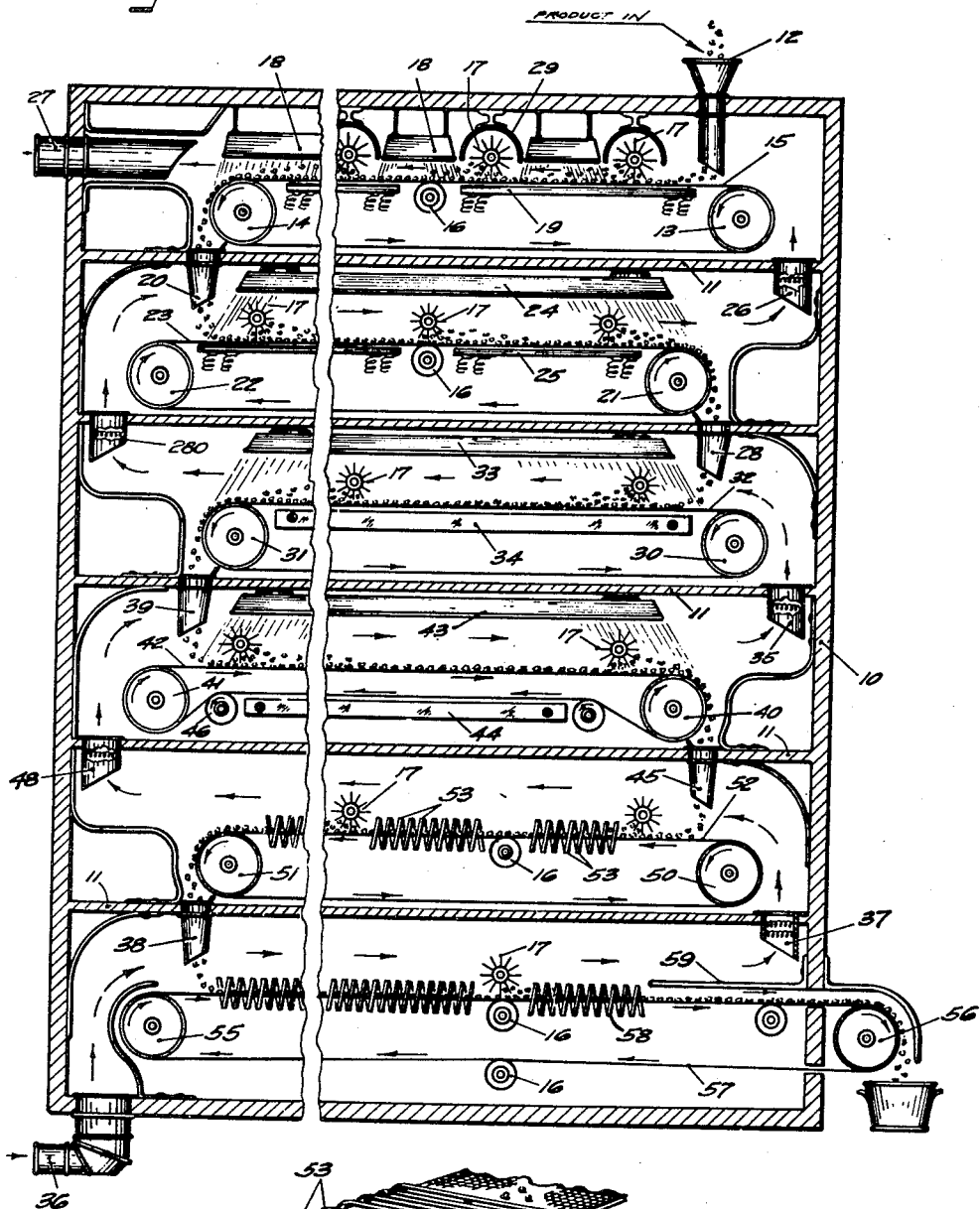

April 29, 1947.　　　　C. BIRDSEYE　　　　2,419,875
DEHYDRATING FOOD BY RADIANT ENERGY AND GAS
Filed April 29, 1942

INVENTOR.
BY Clarence Birdseye.

Patented Apr. 29, 1947

2,419,875

UNITED STATES PATENT OFFICE 2,419,875

DEHYDRATING FOOD BY RADIANT ENERGY AND GAS

Clarence Birdseye, Gloucester, Mass., assignor to Dehydration, Inc., Gloucester, Mass., a corporation of Massachusetts Application April 29, 1942, Serial No. 440,967

14 Claims. (Cl. 34—17)

This invention relates to the preparation of dried food products from meats, fish, vegetables, fruit or combinations of moist or moisture-containing comestibles.

The general object of this invention is to achieve by a rapid, automatic and inexpensive process of treatment dried food products of high quality and in the form best answering to the housewife's requirements.

I have discovered that under certain conditions of treatment it is possible to dry food products with extreme rapidity, and yet to retain their natural color, flavor, and aroma, all without the complications and expense of frequently adjusted and critically controlled humidity.

The process of my invention is based upon the discovery that, under certain conditions, it is not only practicable but desirable to employ a hot arid gas from the very beginning to the end of the process to effect continuous rapid removal of surface moisture from the food product. However, my process can be employed without "case-hardening" or otherwise damaging the product only if the product is first reduced to units having a thickness of not over about ¼" and thus a relatively high surface-to-bulk ratio in order that the internal moisture may be passed readily to the surface and evaporated therefrom, and second, if heat is generously and substantially continuously supplied to the interior of the product, as by radiant energy or diathermy in a high frequency field. The rapid removal of surface moisture cools the product and so permits the employment of a hot arid gas without danger of overheating or scorching. For example, a dehydrating gas at 325° F. may be employed without overheating the product, and dehydration by such hot, very arid gas may proceed safely so long as the surface moisture removed thereby is rapidly and constantly replaced by moisture from the interior of the product, so that the surfaces of the pieces of product remain constantly moist. Under such conditions there can be no case hardening. Third, the product must be frequently and positively agitated or stirred in order constantly to present fresh surfaces of the product to the action of the hot arid gas. The result of these coordinated steps, or certain of them in combination, is to effect, without case-hardening, rapid and economical dehydration, and to produce a dried food product of the highest quality in flavor, aroma, and food value.

While the process of my invention may be applied to the production of practically all food products of the general character mentioned, it may be carried out with particular advantage in the treatment of white and sweet potatoes, onions, cabbage, carrots, beets, parsnips, turnips, celery, spinach and the like.

As a preliminary step of the process it is proposed to cut the raw food product in slices or pieces of the thickness best suited for preparing that particular food for the table. For example, in the case of carrots, slices approximately $\tfrac{1}{16}"$ thick are very desirable from that standpoint and accordingly carrots are preliminarily prepared by slicing to that thickness. The sliced product is next blanched preferably by steam treatment, to inactivate the enzymes and partially cook the product without substantial loss of soluble matter. The sliced and blanched product is then delivered to a conveyor in the drying apparatus, said conveyor preferably having a moisture-absorbent surface, where the product is at once subjected to a current of hot arid dehydrating gas, preferably much hotter than itself, and further heated both from beneath through the conveyor surface and internally by radiant energy. Under this treatment, and with the aid of frequent stirring, moisture is continually driven outwardly from the interior of the product to maintain moisture on the surface. Consequently a dehydrating gas at a temperature as high as 325° F. may be employed without ever raising the temperature of the product above 150° F. Meanwhile in its travel the product is forcibly and repeatedly removed or lifted from and returned to the conveyor surface, the time of uninterrupted contact with the conveyor surface being too short for objectionable adhesion to take place.

There are other important though optional characteristics of my improved process. In the case of products consisting of masses of units having different surface-to-bulk ratios, it is desirable, during the process, to separate or winnow the small or thin pieces or particles of the food product which have become dry and to advance them rapidly through and out of the zone of treatment. This desirable result is effected in accordance with my invention by the dehydrating gas current which is directed so that it picks up dried particles from the agitated food product and carries these forwardly ahead of the mass under treatment. This winnowing action not only improves the efficiency of the process but permits the safe employment of hotter and drier gas in treating the remainder of the mass than would otherwise be possible. Furthermore, the frequent strenuous stirring or agitation of the product mass better exposes the product units to the gas current, and so aids the above-mentioned progressive separation of the lighter pieces.

A valuable and economical feature of my novel process is that, since I furnish by means other than the dehydrating gas a large proportion of the heat required in the process, I am enabled to employ a minimum volume of gas and so effect considerable saving. The relatively small volume of hot arid gas required in practicing my process makes it possible to reduce the size of the apparatus and still achieve high capacity.

Another important advantage of my process is that, while I use arid gas hotter than the product during the early stages, while substantially all the product surfaces are still wet and consequently cooled by rapid evaporation, in the later stages of the process I employ arid gas cooler than the product to which heat is constantly furnished by radiant energy; and by means of the relatively cool gas current prevent overheating and damage to those portions or pieces of the product which have become so dry that they no longer have the protection of a substantial amount of surface moisture.

There is, of course, wide choice in the apparatus that may be used to carry out the process above outlined; and other novel features and characteristics of my invention are brought out by the apparatus selected in each instance. For example, where a product-conveying surface is employed, this may consist of fibrous or other moisture-absorbent material and may be arranged to absorb surface moisture from the product in one portion of its path and to be dried in another, or to be subjected to drying heat while it is absorbing moisture from product freshly deposited upon it. In certain instances I may use a product-conveying substance, e. g., light-weight canvas, which has the virtues of both absorbing moisture from the product, not readily adhering to the product, and being readily cleaned and sterilized.

When a series of conveyor belts is employed, these may well be of absorbent material and may be operated at different rates of speed if desired, so that the product may be subjected for different intervals to certain stages of the process, or so that the product may be concentrated or accumulated on the conveying surface as the bulk of its individual pieces is reduced in the process of its dehydration.

Reference is here made to my co-pending application Ser. No. 456,903, filed September 1, 1942, in which originated the apparatus claims of the present application; also Ser. No. 554,603, filed September 18, 1944, as a division of the present application.

Figure 2:
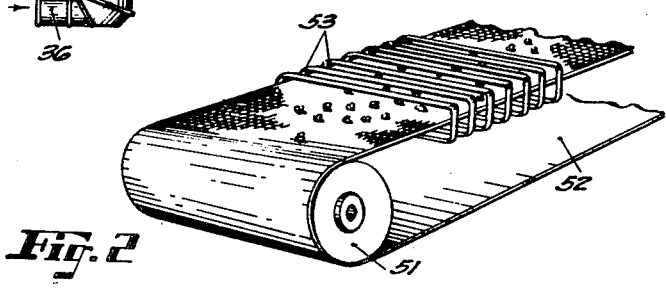

These and other characteristics of my improved process will be best understood and appreciated from the following description of a preferred manner in which it may be put into practice with the assistance of suitable apparatus, all as shown in the accompanying drawings, in which, Fig. 1 is a diagrammatic view in elevation of apparatus of the multiple belt type, and Fig. 2 is a fragmentary view in perspective of a portion of one of the belts.

It will be understood that the illustrated apparatus is designed to dehydrate moist or moisture-containing food products by subjecting the same to a hot arid surface-drying current of gas and simultaneously to internal heating by radiant energy so that any moisture the product may contain is drawn to its surface. While subjected to these two influences the product may be stirred or agitated and preferably selectively separated and the drier portions of the product advanced at a faster rate than the product which at the same location in the apparatus is less dry.

The apparatus comprises a rectangular casing 10 having heat insulating walls and being divided by partitions 11 into a series of six elongated horizontal compartments. In some cases the partitions may be eliminated and conveyor belts arranged to divide the casing into adjacent compartments. A hopper 12 is provided in the upper wall of the casing through which moisture-containing product is delivered to the apparatus. The product may be in the form of fresh fruits or raw vegetables cut into slices or pieces of appropriate size or it may be food products which have been blanched or partially cooked or passed through any other preliminary process.

Within the upper compartment are provided rolls 13 and 14 over which runs an endless conveyor belt 15 which may be of canvas or other fibrous, moisture-absorbent material. The product is delivered to the upper surface of the belt 15 near the right-hand end of the upper compartment, and fed toward the left where it is finally spilled from the conveyor belt through a chute 20 in the partition 11 and upon a second conveyor belt. The belt 15 is partially supported in its upper reach by one or more idle rolls 16 and is provided adjacent to its upper surface with a series of agitating devices which, as herein shown, may comprise rotary brushes 17 having steel wire bristles and mounted to rotate in a path just clearing the surface of the belt and in position to engage the product thereon, and agitate it by picking it up and throwing or brushing it into the space above the belt. Each brush is equipped with an arched shield 29 of canvas or the like to keep the agitated food product within bounds.

The product under treatment is violently agitated at frequent intervals, being lifted from the belt and thrown in the path of a hot arid dehydrating current of gas which sweeps from right to left through the chamber and is admitted through an electrically heated duct 26 at the right hand end of the compartment and is drawn out through an outlet duct 27 in the upper left hand corner of the casing. Above the belt 15 is provided a series of radiant heaters 18 of any desired construction and these are arranged to subject the product spread upon the belt 15, and agitated in the space above the belt, to concentrated rays of radiant energy, preferably having a peak output in the spectrum band between 7,500 and 25,000 Angstrom units. Radiant energy supplied in this form is effective to heat the product internally throughout its mass and so cause the moisture contained in the center portions of the product units to pass relatively rapidly to the surfaces of the units.

Heating means is also provided beneath the active surface of the belt and this is herein shown as a pair of elongated electric heaters 19 arranged in close proximity to, or in actual contact with the under surface of the upper reach of the belt 15.

It will thus be seen that the belt is constantly heated and dried by the heaters 19 and that the product is accordingly heated by conduction from the belt. At the same time the product is subjected to radiant heat from the heaters 18 and to the heating and drying effect of the hot arid gas current which sweeps over it with a substantial velocity after having been additionally heated by passing through the heating elements located in the duct 26.

In the second compartment are provided rolls 21 and 22 for a conveyor belt 23 similar to that already described and provided like that with intermediate supporting rolls 16, rotary agitating brushes 17, overhead radiant heater 24, and electric heaters 25. Newly heated arid dehydrating gas is admitted to the left hand end of this second chamber through an inlet 280. The gas current is directed from left to right through this compartment, up through the duct 26 and then from right to left in the upper compartment until it reaches the outlet 27. The belt 23 is driven from left to right in the second compartment of the casing so that the gas current passes in overtaking or concurrent direction of flow across both these belts and the product carried thereby.

In its passage across the food product the gas tends to be reduced in temperature by evaporation of moisture into it but this loss of heat is more than made up by the heaters between the compartments, and by contact with the infra-red ray generators, so that in general the gas is at its maximum temperature when it encounters the fresh moist product at the right hand end of the belt 15. The belts 15 and 23 are staggered so that the product falling from the upper belt lands on the face of the lower belt and this is the arrangement of all the belts in the apparatus.

The third and fourth compartments are similarly equipped with rolls 30 and 31 for the belt 32, rolls 40 and 41 for the belt 42, radiant heaters 33 and 43, and agitating brushes 17. The partition forming the upper wall of the third compartment is provided with a chute 28 through which product from the belt 23 reaches the belt 32 and the third partition is provided with a chute 39 through which product from the belt 32 reaches the belt 42. Instead of electric heaters the belt 32 is shown as heated by steam plate 34 located between the upper and lower reaches of the belt. The third compartment is provided with a heated inlet duct 35 for hot dehydrating gas. This is admitted to the third compartment and directed so that it flows over the product in treatment upon the conveyor belts in an overtaking direction from the point of its admission to its discharge at the left hand end of the compartment.

In the fourth compartment the belt 42 is deflected upwardly in its lower reach by idle rolls 46 and a steam plate 44 is located in close proximity to the belt in its passage between these two idle rolls. This arrangement is desirable in that it compacts the apparatus vertically and may be employed if desired in apparatus where the horizontal partitions are omitted. Dehydrating gas is admitted to the fourth compartment through a heated inlet duct 48 at the left hand end of the compartment and discharged to the third compartment through a similar heated outlet duct 35.

The fifth compartment is provided with rolls 50 and 51 for a conveyor belt 52 provided with an idle supporting roll 16 and agitating brushes 17 as before. The product reaches the belt 52 by falling through the chute 45 from the belt 42. The upper reach of the belt 52 is arranged to travel longitudinally through a coil or spiral of wire or metal tubing 53 which is included in a high frequency alternating electric current so that the food product in being advanced on the belt 52 through the coil is internally heated by radiant energy supplied in this manner rather than from the heaters described as being present in the upper compartments. As the product dries more and more it is less readily heated by the electrical field at this stage of the process and so is relatively safe from overheating.

The lower partition 11 of the fifth compartment is provided with a chute 38 through which the product from the belt 52 falls upon a belt 57 located in the lowermost compartment of the series. This belt runs upon a pulley 55 within the compartment and a pulley 56 located outside the casing, passing through a high frequency coil 58. A shield 59 provides a wide shallow throat permitting passage of the now dehydrated food product without the discharge of any considerable part of the gas current which has been flowing through the lower compartment in an overtaking direction over the product upon the belt. Dehydrating gas is admitted to the lower compartment through an inlet duct 36 in its lower left hand corner, and the major portion thereof is discharged upwardly into the second compartment through a heated outlet duct 37 located in the upper right hand corner of the lower compartment. In its passage through the lower compartment this gas current is effective to pick up and advance toward the exit pieces or particles of the product which have become dry or partially so and thus reduced in specific gravity as compared to the rest of the product on the belt 57. This winnowing effect is promoted by the action of the wire brush 17 which is shown as associated with the belt 57 and which throws the product upwardly so that the gas current may pass through it, advancing the lighter and drier pieces of product through the drying chamber further than the larger and heavier pieces of product which are less affected by the gas current. A portion of the gas admitted to the lower compartment passes outwardly with the dried product, but the major part passes upwardly through the apparatus and is finally discharged through the outlet duct 27.

As already noted, the arid gas admitted to the product by the duct 36 may be of a temperature of perhaps 110° F. to 130° F. while the product at this stage may be heated by radiant energy or in an electrical field to 120° F. to 150° F. During the course of the gas upwardly through the apparatus it continuously loses heat through evaporation of moisture from the product, but simultaneously receives more heat from electrical elements such as those located in duct 37, from the product which has been heated by radiant or electrical energy, from the ray-generating means, and from some of the other metallic parts of the apparatus. In this way the temperature of the gas increases, and its aridity is maintained, as the gas passes upwardly through the apparatus. Thus it may reach the right hand end of the upper belt 15 at a temperature of 300° F. to 350° F. and finally passes out the outlet duct 27 at substantially that high temperature.

While I now prefer to circulate the dehydrating gas as indicated in the foregoing paragraph, and as shown in Fig. 1, I wish it understood that I may vary the course of gas circulation, within the scope of this invention, as circumstances may dictate. While air is a satisfactory dehydrating medium for most food products, I may substitute for it any suitable inert gas should that prove desirable.

Having thus disclosed my invention and described in detail the best manner now known to me to put it into effect, I claim as new and desire to secure by Letters Patent:

1. In a food dehydrating process, the steps of passing the food longitudinally through and downwardly from one to another of a series of superposed compartments, and subjecting the food while passing through several adjacent compartments to a current of dehydrating gas, progressively increased in temperature, moving upwardly from one to another compartment and through said compartments and flowing in the same longitudinal direction as that in which the food is moving through said series of compartments.

2. In a food dehydrating process, the steps of advancing the food through zones of convective heat and infra-red radiation to remove a part of the original moisture content, heating the partially dehydrated food by passing it through a high-frequency electric field, and then removing additional moisture from the food by a current of dehydrating gas.

3. In a food dehydrating process, the steps of passing food units longitudinally and downwardly through a series of superposed compartments, passing a current of dehydrating gas, progressively increased in temperature, upwardly from one to another compartment and through the said compartments and concurrently with the product in any two adjacent compartments of the series, positively and repeatedly agitating the food units in the dehydrating gas current while passing through the compartments, thereby winnowing the mass of food units repeatedly as they are advanced through the several compartments.

4. In a food dehydration process, the steps of passing food units longitudinally through and downwardly from one to another of a series of superposed compartments, moving the food units in opposite directions in adjacent compartments, and meanwhile passing a current of dehydrating gas upwardly through said compartments and concurrently with the movement of the food units in any two adjacent compartments of the series.

5. In a food dehydrating process, the steps of passing food units longitudinally through and downwardly from one to another of a series of superposed compartments, moving the food in opposite directions in adjacent compartments, heating the food units by both radiant energy and conducted heat while passing through one of said compartments, and passing a current of dehydrating gas upwardly through said compartments and concurrently with the food units as they are advanced in any two adjacent compartments of the series.

6. In a dehydrating process, the steps of passing a moisture-containing product longitudinally and downwardly through a series of superposed passages, flowing a current of dehydrating gas upwardly and through the passages and concurrently with the product, and heating the gas progressively in its travel upwardly between and through the passages.

7. In a food dehydrating process, the steps of advancing a moisture-containing food in successive horizontal paths alternating in direction, each path being in a confined space and at a different level, heating the food in its said advancing movements, passing the food downwardly to a lower level at the end of each path, and subjecting the food to a current of dehydrating gas, progressively increased in temperature, flowing always in the same direction in which the food is moving in adjacent paths and upwardly from one to another of said confined spaces.

8. In a food dehydrating process, the steps of advancing a moisture-containing food horizontally in successive paths alternating in direction and located one above another, intermittently agitating the food at fixed areas in its paths in its advancing movement in said paths, heating the food, passing the food downwardly from one level to another at the end of each path, and subjecting the food to a current of dehydrating gas flowing in the same direction in which the food is moving and flowing upwardly from one path to the next.

9. In a food dehydrating process, the steps of advancing the food progressively in paths of alternate direction and at different levels, simultaneously heating the food by radiant energy from above, intermittently agitating the food, passing the food downwardly from one level to another at the end of each path, and flowing a current of dehydrating gas, progressively increased in temperature, over and through the food in the same direction in which it is moving in two adjacent paths and upwardly from level to level.

10. In a food dehydrating process, the steps of advancing the food in exposed condition through spaced high frequency electric fields and thereby internally heating the food, agitating the food between certain of said spaced fields, and flowing a current of dehydrating gas through the food in the same direction in which it is being advanced through the said high frequency fields, thereby advancing the lighter and drier units of the food at a faster rate than the heavier units thereof.

11. In a food dehydrating process, the steps of advancing a moisture-containing food in exposed condition in a horizontal path through high frequency electric fields that are spaced longitudinally from each other along the said path, agitating the food in the intervals between the electric fields, and flowing a current of dehydrating gas over the food in the direction of its advancing movement, thereby advancing the lighter and drier units of food at a faster rate than the heavier units thereof.

12. In a dehydrating process, the steps of continuously advancing a moisture-containing food in an elongated enclosed path, removing a substantial fraction of the original moisture content of the food by subjecting it while being so moved to a combination of radiant energy and convective heat, at the same time subjecting the food to a concurrent flow of dehydrating gas of such velocity as to bring about a winnowing of the food units, and then subjecting the food to the heating influence of a high frequency electric field.

13. In dehydrating apparatus, an enclosure having a series of conveyors upon which the product is distributed and carried arranged one above another therein, means for driving adjacent conveyors in opposite directions, means for delivering a product to be dehydrated to the uppermost conveyor in the series, and means for directing a dehydrating current of gas upwardly from one conveyor to another and over the product in the same direction in which the product is advanced by said conveyors on at least two adjacent conveyors of the series.

14. In dehydrating apparatus, the combination of a series of movable conveyors disposed one above another, means for moving adjacent conveyors in opposite directions, means for distributing food units upon the uppermost conveyor of the series, means for directing the product downwardly from conveyor to conveyor, means for directing radiant energy to the product upon the conveyors, means for heating the individual conveyors, and means for directing a current of dehydrating gas concurrently over the product upon one of the lowermost conveyors of the series and then upwardly in concurrent flow over the product upon each conveyor disposed above it.

CLARENCE BIRDSEYE.

REFERENCES CITED

The following references are of record in the file of this patent:

UNITED STATES PATENTS

| Number | Name | Date |
|---|---|---|
| 1,510,615 | Walsh | Oct. 7, 1924 |
| 1,929,090 | Bryant | Oct. 3, 1933 |
| 2,042,145 | Darrah | May 26, 1936 |
| 2,231,457 | Stephen | Feb. 11, 1941 |
| 234,412 | Lee et al. | Nov. 16, 1880 |
| 289,635 | Farrington | Dec. 4, 1883 |
| 312,341 | Duryea | Feb. 17, 1885 |
| 312,342 | Duryea | Feb. 17, 1885 |
| 1,284,218 | Benjamin | Nov. 12, 1918 |
| 2,090,177 | Bill | Aug. 17, 1937 |
| 2,155,453 | Stuntz | Apr. 25, 1939 |
| 2,158,354 | Cowgill | May 16, 1939 |
| 791,029 | Johnson | May 30, 1905 |
| 907,925 | Watters | Dec. 29, 1908 |
| 2,267,259 | Adt | Dec. 23, 1941 |
| 832,961 | Elkus | Oct. 9, 1906 |
| 1,126,077 | Prindle | Jan. 26, 1915 |
| 1,262,416 | Warrick | Apr. 9, 1918 |
| 240,581 | Edwards | Apr. 26, 1915 |
| 1,676,306 | White | July 10, 1928 |
| 1,646,498 | Seede | Oct. 25, 1927 |
| 2,093,061 | Wallace | Sept. 14, 1937 |
| 1,225,212 | Benjamin | May 8, 1917 |
| 750,535 | Goings | Jan. 26, 1904 |
| 776,581 | Angus | Dec. 6, 1904 |
| 1,423,188 | Cardin | July 18, 1922 |
| 1,294,805 | Horst | Feb. 18, 1919 |
| 708,946 | Welch | Sept. 9, 1902 |
| 1,783,673 | Rehe | Dec. 2, 1930 |
| Re. 16,699 | Cano | Aug. 9, 1927 |
| 1,562,761 | Harris | Nov. 24, 1925 |
| 2,341,101 | Howard | Feb. 8, 1944 |
| 14,494 | Davis | Mar. 25, 1856 |
| 2,174,897 | Sackett | Oct. 3, 1939 |
| 2,533,929 | Taylor | Feb. 12, 1895 |
| 2,054,937 | Kremer | Sept. 22, 1936 |
| 1,913,470 | Andersen | June 13, 1933 |
| 251,105 | Fowler et al. | Dec. 20, 1881 |
| 1,866,768 | Harris | July 12, 1932 |

FOREIGN PATENTS

| Number | Country | Date |
|---|---|---|
| 464,758 | British | Apr. 20, 1937 |
| 439,549 | British | Sept. 3, 1934 |
| 434 | British | 1853 |
| 19,919 | German | Nov. 7, 1882 |
| 9,308 | British | 1903 |
| 229,909 | German | Jan. 10, 1911 |
| 400,947 | French | June 29, 1909 |
| 148,082 | British | July 29, 1920 |